United States Patent [19]
Schrag et al.

[11] 4,053,071
[45] Oct. 11, 1977

[54] METHOD AND APPARATUS FOR TRANSPORTING AND PROCESSING MULTIPLE ROUND BALES

[75] Inventors: Thomas Gene Schrag; Merle Keith Burkhart, both of Newton; Arnold Elmer Goertz, Buhler, all of Kans.

[73] Assignee: Hesston Corporation, Hesston, Kans.

[21] Appl. No.: 674,496

[22] Filed: Apr. 7, 1976

[51] Int. Cl.² .................. A01D 90/00; B60P 1/36
[52] U.S. Cl. ........................ 214/506; 214/82; 214/152; 214/508; 214/518; 214/101 A
[58] Field of Search .......... 214/82, 83.14, 83.3, 214/518–522, DIG. 4, 91 R, 506, 152, 508; 241/101 A, 101.7

[56] References Cited
U.S. PATENT DOCUMENTS

| | | | |
|---|---|---|---|
| 2,685,900 | 8/1954 | Cross | 241/101 A X |
| 3,037,780 | 6/1962 | Skromme et al. | 214/519 X |
| 3,915,392 | 10/1975 | Kugler | 241/101 A X |
| 3,920,190 | 11/1975 | Kanengieter et al. | 241/101.7 X |
| 3,952,895 | 4/1976 | Campbell | 214/508 |

Primary Examiner—Robert G. Sheridan
Attorney, Agent, or Firm—Schmidt, Johnson, Hovey & Williams

[57] ABSTRACT

Large round bales are picked up in the field by forcing the inclined bed of the machine beneath the bales while simultaneously drawing them onto the bed with a conveyor chain. With the bed leveled, the bales can be transported end-to-end to a feeding location and, while still moving, thereupon successively transferred laterally to an outboard disintegrating unit which drops the material in a continuous stream to the ground or into a feed bunk. After each lateral transfer and outboard disintegration, the bales are advanced along the bed until the next succeeding bale is in position for processing. Alternative forms of lateral transfer apparatus include a lift that swings a bale upwardly off the bed and into the disintegrating unit, a ramp that cocks the bale toward the disintegrating unit in position for an overhead door to sweep the cocked bale into the unit, and an overhead feeder that reaches across the bed and draws the bale into the unit.

37 Claims, 11 Drawing Figures

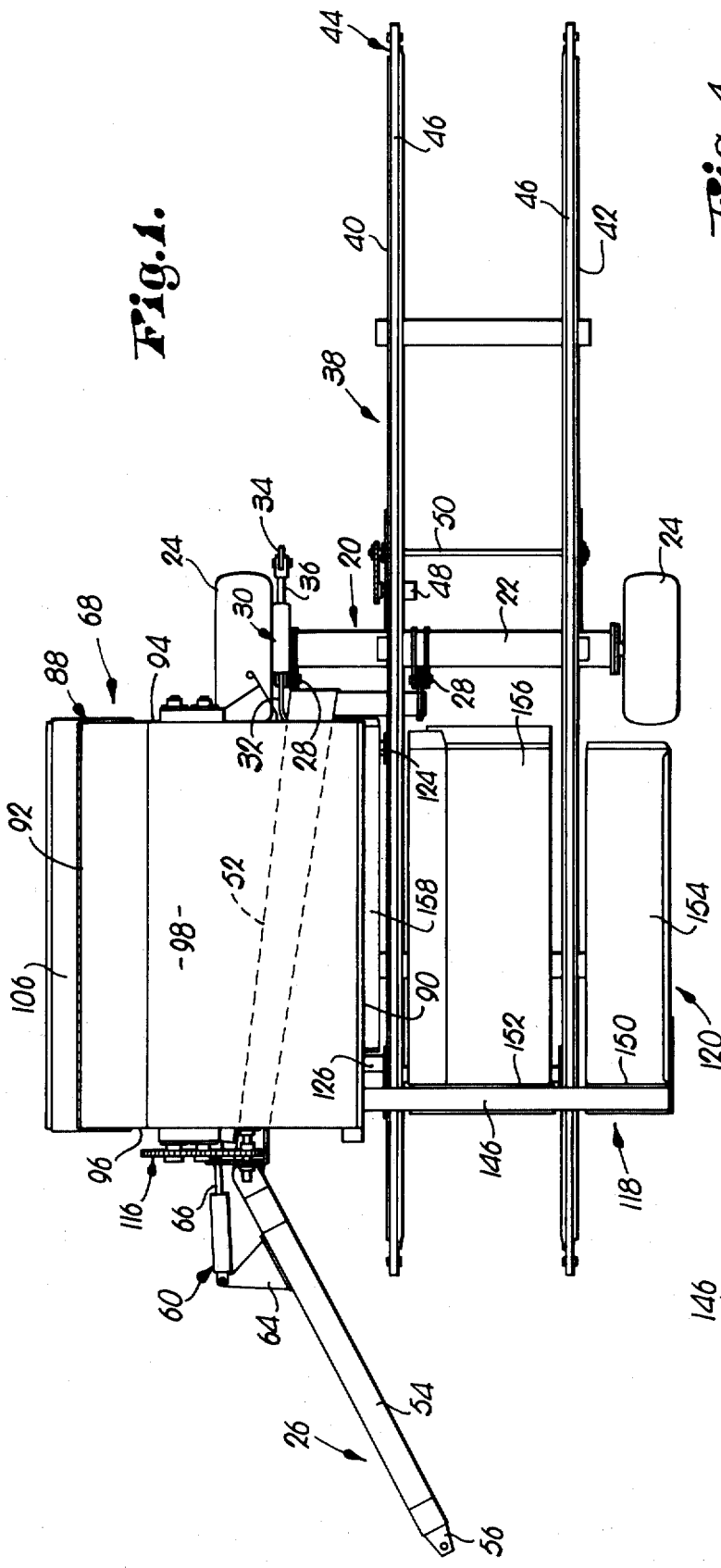
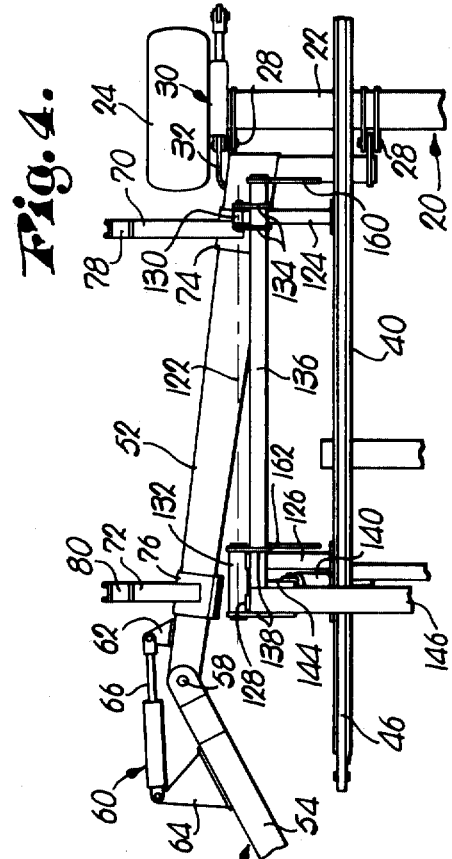
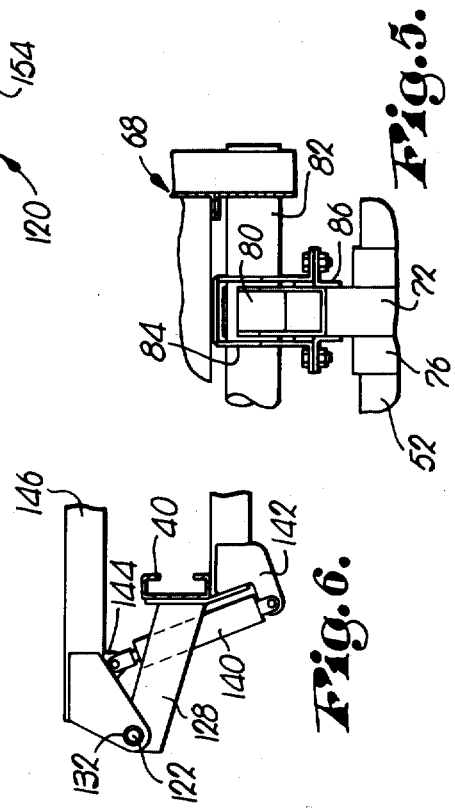

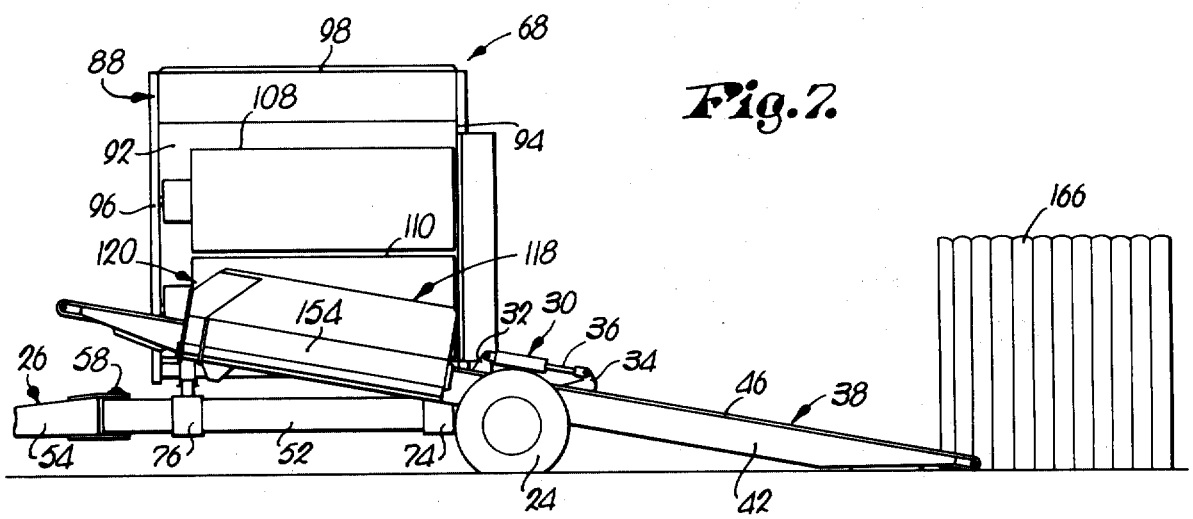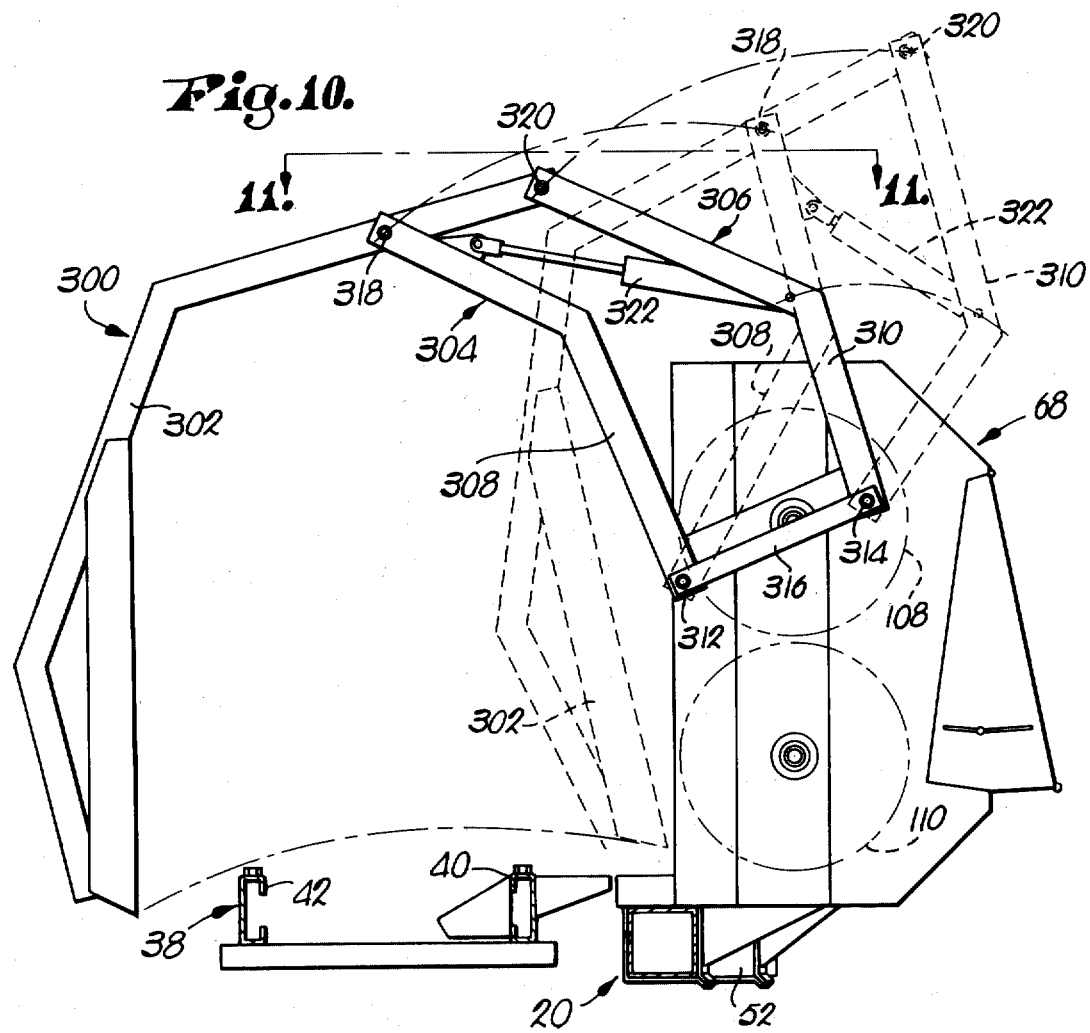

METHOD AND APPARATUS FOR TRANSPORTING AND PROCESSING MULTIPLE ROUND BALES

This invention relates to feeding a body of crop material, such as a small stack or large bale, to livestock while on the move. Numerous devices are presently commercially available to ranchers and stockmen for achieving this style of rapid, one-man feeding, but heretofore they have all utilized a disintegrating unit located at the leading end of the machine in such a position that the operator of a tractor towing the machine has an obstructed view of activity behind the disintegrating unit. Where the machine is self-loading by virtue of a bed that may be tilted rearwardly to the ground and then backed under the haystack or other crop body to be processed, the loading procedure may be difficult for the operator because of his poor visibility.

Therefore, one important object of the present invention is to achieve at least the same quality of crop disintegration as prior machines having disintegrating units "in line" with their load-carrying beds but avoid the problem of poor visibility.

Pursuant to the foregoing object, it is an important aim of this invention to locate the disintegrating unit laterally outboard of the bed, outside of the normal line of vision of the operator to the rear of the machine, such as to provide excellent visibility for loading and other purposes while at the same time obtaining the virtues of dropping the disintegrated material directly from the unit in a windrow alongside the advancing machine.

An additional important object of this invention is to mount the disintegrating unit in such a way that the bed may be tilted to the ground for self-loading without interference from and without supporting the weight of the disintegrating unit.

Another important object of this invention is to provide lateral transfer apparatus between the bed and the disintegrating unit which is so effective that positive, controlled transfer of a crop body from the bed to the disintegrating unit can be carried out even where the bed utilizes a pair of spaced, for-and-aft extending beams for supporting large round bales which tend to sag down between the beams during transport and thereby normally resist lateral transfer.

Pursuant to the foregoing object, another important goal of this invention is to provide alternative forms of such transfer apparatus, including a lift that swings a body upwardly off the bed and into the disintegrating unit, a ramp that cocks the body toward the disintegrating unit in position for an overhead feeder to sweep the cocked body into the unit, and an overhead feeder that reaches across the bed and draws the body progressively into the unit.

A still further object of this invention is to provide in conjunction with at least certain of the foregoing alternative lateral transfer apparatuses, the capability of loading the machine from either the front or rear thereof by tilting the bed to the ground in either direction and conveying the bales up the inclined bed without interference from the apparatus.

In the drawings:

FIG. 1 is a top plan view of a machine constructed in accordance with the principles of the present invention and capable of carrying out the method thereof;

FIG. 4 is a fragmentary plan view of the machine with the disintegrating unit removed, showing details of the mounting structures for the unit and the lateral transfer lift;

FIG. 5 is an enlarged, fragmentary, cross-sectional view of the machine taken along line 5—5 of FIG. 2;

FIG. 6 is an enlarged, fragmentary detail view of the power device for the lateral transfer lift at one end of the latter;

FIG. 7 is a schematic view of the machine on a reduced scale illustrating the manner in which the bed may be tilted rearwardly to the ground for self-loading;

FIG. 10 is a view of the machine similar to FIGS. 2 and 8 but showing a third form of lateral transfer apparatus.

DESCRIPTION OF FIGS. 1-7

Figure 2:
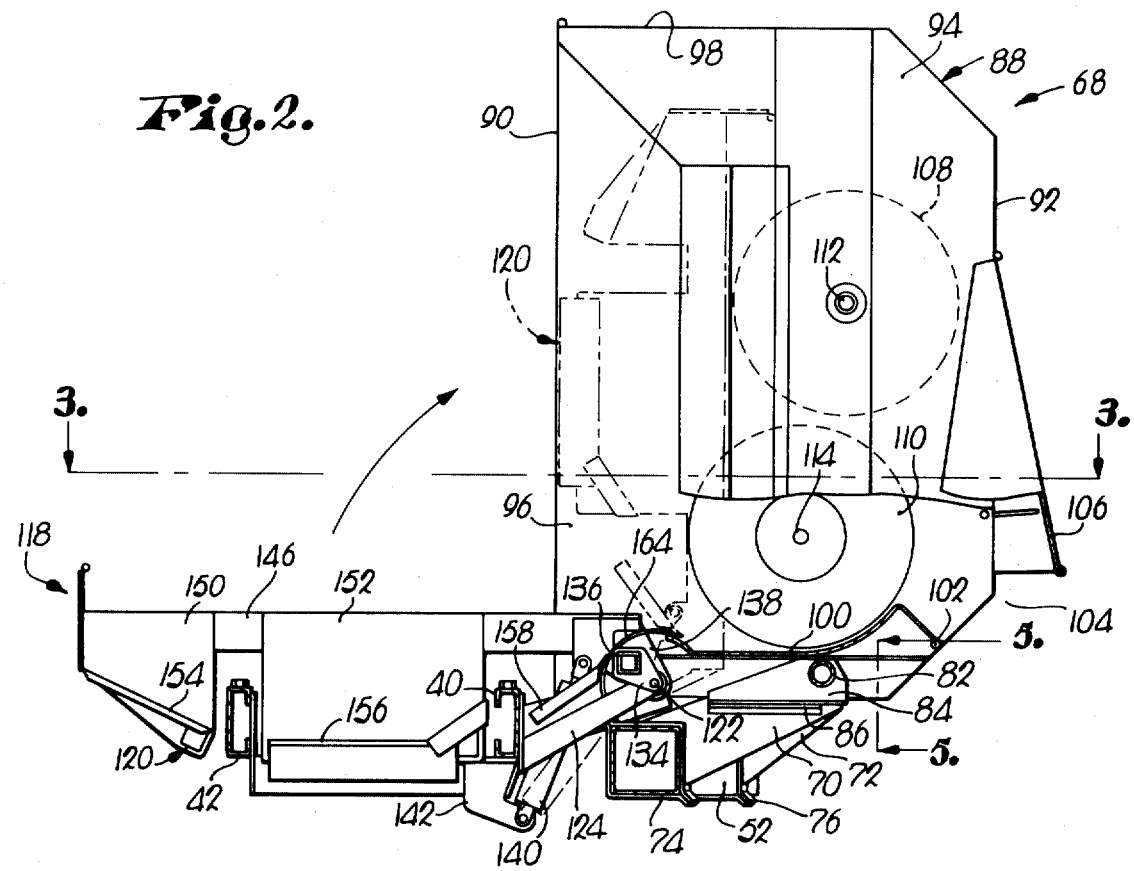
FIG. 2 is a slightly enlarged, fragmentary, essentially transversely vertical cross-sectional view through the machine looking forwardly, parts being broken away to show details of construction and the lateral transfer lift being shown in its fully raised position by broken lines.
Figure 3:
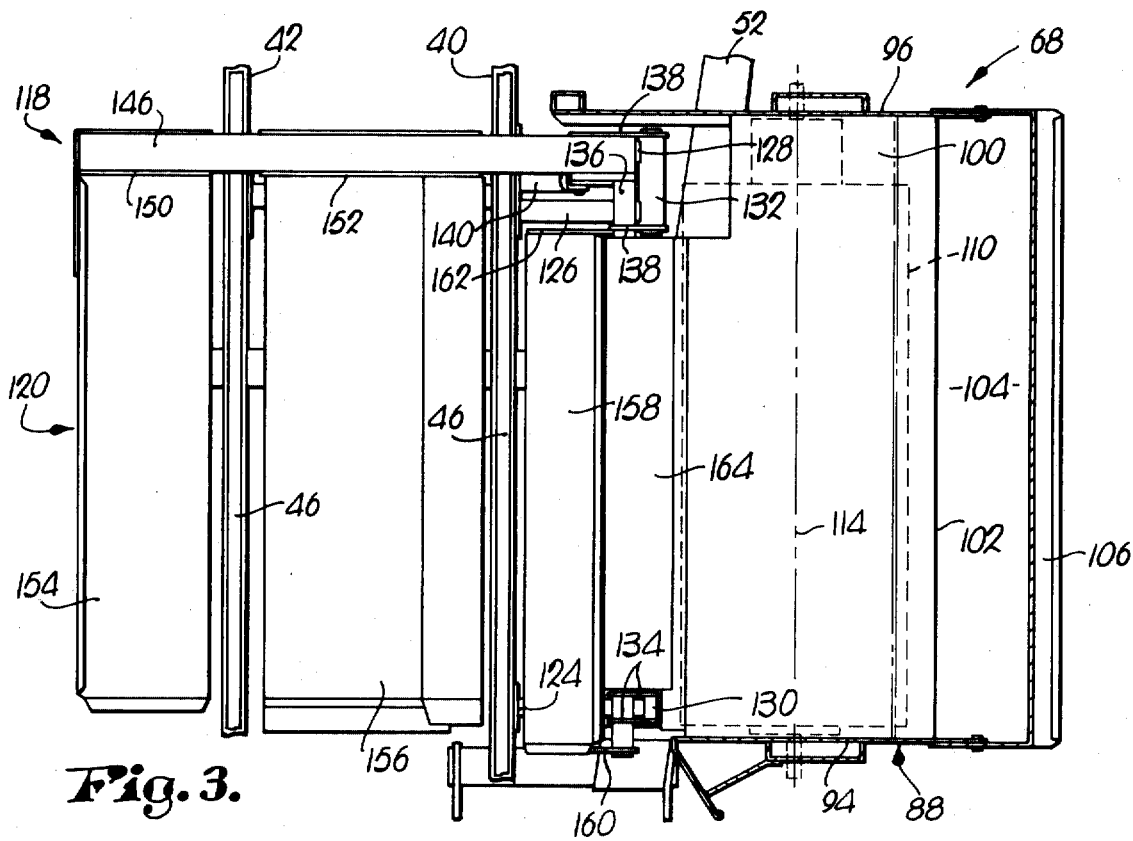
FIG. 3 is a horizontal cross-sectional view of the machine taken along line 3—3 of FIG. 2.

The machine has a wheeled chassis 20 that includes a transverse box beam 22, a pair of rotatable ground wheels 24 at opposite ends of the box beam 22, and a towing tongue 26 extending forwardly from box beam 22 adjacent the right end of the latter as viewed from the rear of the machine. The tongue 26 and the box beam 22 are pivotally interconnected for buckling the chassis 20 about a transverse axis slightly forward of the box beam 22, such connection being accomplished by a pair of laterally spaced, aligned, horizontal pivots 28. A fluid pressure piston and cylinder device 30 interconnects upright, rigid lugs 32 and 34 on the tongue 26 and the box beam 22 respectively to effect powered buckling of chassis 20 about pivots 28 in response to extension and retraction of the ram 36 of hydraulic device 30.

The box beam 22 rigidly carries a fore-and-aft extending bed 38 which may take several different forms depending upon the character of the crop body to be handled by the machine. For the purposes of illustration, the bed 38 is shown as being especially suited for handling large round bales and therefore is formed by a pair of laterally spaced, fore-and-aft extending beams 40 and 42 fixed substantially at their midpoints to the box beam 22 for movement therewith during buckling of the chassis 20. As a result of this fixed relationship between bed 38 and box beam 22, upon extension of the ram 36 of hydraulic device 30, the bed 38 may be tilted rearwardly to the ground as illustrated in FIG. 7 as the chassis 20 buckles about pivots 28 and the box beam 22 rotates clockwise relative to the ground wheels 24 about their axis of rotation. A loading conveyor 44 on the bed 38 is in the nature of a pair of endless chains 46 looped longitudinally about the beams 40 and 42 so that the chains 46 are exposed along the top longitudinal surfaces of the beams 40, 42. The chains 46 may be driven along the beams 40 and 42 by a reversible hydraulic motor 48 coupled with a drive shaft 50 common to the two chains 46, the motor 48 and shaft 50 being disposed rearwardly adjacent the box beam 22.

The tongue 26 is of a two-part construction, having a rearmost stationary section 52 that connects to the box beam 22 through pivots 28, and a forwardmost, laterally swingable section 54 that connects to a towing vehicle (not shown) through a hitch 56 at its forward end. A vertical pivot 58 (FIG. 4) between the sections 52 and 54 provides the forwardmost section 54 with its swingability, and a hydraulic piston and cylinder device 60 between laterally projecting lugs 62 and 64 on sections 52 and 54 provides powered swinging of section 54. Such an arrangement permits the machine to be towed directly behind the point of connection with the towing vehicle as illustrated in FIG. 1, or off to the left side thereof when the ram 66 of hydraulic device 60 is retracted such as to bring sections 52 and 54 into longitudinal alignment with one another.

The stationary section 52 carries an upstanding disintegrating unit 68 that is disposed laterally outboard of the bed 38 with respect to the path of travel of the latter. As shown best in FIGS. 2, 4 and 5, a pair of depending legs 70 and 72 on the unit 68 are fastened by two-part clamps 74 and 76 respectively, to the stationary section 52 at the lowermost ends of legs 70, 72 while sockets 78 and 80 on the upper ends of legs 70 and 72 respectively complementally receive a fore-and-aft structural pipe 82 of unit 68. As illustrated in FIGS. 2 and 5 the pipe 82 has for each leg 70 and 72 an upper clamp half 84 fixed thereto which is bolted against a lower clamp half 86 fixed to the corresponding leg 70, 72. By virtue of this mounting on the stationary tongue section 52, the disintegrating unit 68 remains stationary during any tilting activity of the bed 38 such as during loading thereof as illustrated in FIG. 7.

The unit 68 further includes a box-like housing 88 having an open front 90 along the bed 38; a rear wall 92 spaced laterally outboard of the front 90; a pair of opposite fore-and-aft spaced sidewalls 94 and 96; and a top wall 98. A floor 100 (FIG. 2) within the housing 88 overlies the structural pipe 82 and terminates at its laterally outboard end 102 inwardly of the rear wall 92, thereby presenting a gap that defines a discharge opening 104 whose lateral dimensions may be varied by adjusting the angular position of a depending baffle 106 on the rear wall 92.

The unit 68 further includes one or more fore-and-aft extending disintegrating rotors 108 and 110 disposed within housing 88 and supported by the latter for rotation about axes 112 and 114 respectively. The rolls 108 and 110 are superimposed one above the other with the top roll 108 offset slightly outboard of the roll 110 as illustrated best in FIG. 2. Drive mechanism 116 carried by the housing 88 on sidewall 96 may be operably connected to the power takeoff shaft (not shown) of the towing vehicle through a suitable driven shaft (not shown) extending along and carried by the front section 54 of the tongue 26, the rotors 108 and 110 preferably both being driven in a clockwise direction viewing FIG. 2. The rotors 108 and 110 may be of any suitable construction, preferably being provided with a plurality of peripheral knives (not shown) that are capable of chewing into crop material presented thereto with sufficient aggressiveness to thoroughly reduce large slugs of the material, thereby enabling the disintegrated material to flow smoothly through the unit 68 and out the discharge opening 104 in a continuous stream.

In order to transfer a body of crop material from the bed 38 into the unit 68, lateral transfer apparatus 118 is provided. In FIGS. 1-7, the apparatus 118 takes the form of a lift 120 mounted on the bed 38 for swinging movement about a fore-and-aft axis 122 (FIGS. 2, 3, 4 and 6) between a lowered position illustrated in solid lines in FIG. 2 and a raised position illustrated in phantom lines in that Figure. The swinging axis 122 of lift 120 is located laterally outboard of the bed 38 generally between the latter and the disintegrating unit 68. Viewing FIGS. 2, 3, 4 and 6 in particular, it may be seen that such outboard disposition of the axis 122 is accomplished by three mounting arms 124, 126 and 128 that extend laterally outwardly from the beam 40 of bed 38 and are spaced apart in a fore-and-aft direction, the arm 124 being rearwardly remote from the other arms 126 and 128 which are forwardly disposed in a closely spaced pair. At its outermost end the arm 124 carries a pivot 130, while the arms 126 and 128 at their outermost ends cooperate to carry a pivot 132, the pivots 130 and 132 in turn defining the swinging axis 122.

Again with particular reference to FIGS. 2, 3, 4 and 6, it may be seen that the pivot 130 has a set of mounting lugs 134 extending inwardly and upwardly therefrom which are rigidly joined with a square structural tube 136 of the lift 120 that spans the arms 124, 126 and 128, the tube 136 in turn being connected to the front pivot 132 by way of a second set of inwardly and upwardly extending mounting lugs 138. FIG. 6 reveals details of construction at the forward end of the lift 120 and shows that a hydraulic piston and cylinder device 140 (also shown in FIG. 2, 3 and 4) is connected between a depending ear 142 on beam 40 and a small depending ear 144 on tube 136 between arms 126 and 128 for supplying the power necessary to swing the lift 120 between its raised and lowered positions.

Extending across the bed 38 from the forward end of the structural tube 136 is a cantilever member 146 that is spaced slightly above the beams 40 and 42 and terminates laterally outwardly beyond the beam 42. Vertical plates 150 and 152 depend from member 146 on opposite sides of the beam 42 and have rearwardly extending panels 154 and 156 respectively at their lower extremities that cooperate to define the load-supporting surface of the lift 120. The panel 156 throughout its major portion, extends parallel to the member 146, while the outer panel 154 slopes downwardly and inwardly with respect to member 146. A third panel 158 located between the beam 40 and the structural tube 136 is carried on the latter by a pair of short arms 160 and 162 (FIG. 4) laterally adjacent the mounting arms 124 and 126 respectively. Panel 158 slopes upwardly and outwardly toward the unit 68 in overlapping relationship to an upwardly arched lip 164 (FIGS. 2 and 3) of the floor 100 such as to seal off the otherwise open area between panel 158 and the floor 100. As illustrated best in FIG. 3, the lip 164 extends substantially the full fore-and-aft distance between the pivots 130 and 132, being substantially concentric with their common axis 122.

OPERATION OF FIGS. 1-7

From the foregoing it should be apparent that the disintegrating unit 68 remains stationary with the tongue 26 during loading of a crop body, while the lift 120 tilts with the bed 38 relative to unit 68 about the axes of rotation of the ground wheels 24, all as shown in FIG. 7. Having tilted the rear of the bed 38 to the ground as in FIG. 7 by extending the ram 36 of hydraulic device 30 so as to buckle the chassis 20 upwardly about pivots 28, the machine is in condition to self-load a crop body such as the large cylindrical or "round" bale 166. The bale 166 is centered endwise between the beams 40 and 42 so that backing the machine toward bale 166, while simultaneously driving the conveyor chains 46 forwardly, causes the bale to be progressively drawn onto the beams 40, 42 in bridging relationship to the latter. The spacing between beams 40 and 42 is, of course, less than the diameter of the bale 166 such that the latter will in fact be carried by beams 40 and 42 instead of slipping between the same, but it will be appreciated that since the bale 166 is engaged at circumferentially spaced locations around the bottom thereof, it tends to partially settle between beams 40 and 42 and become partially contained thereby.

Once the bale 166 has been drawn onto the bed 38, the latter may be re-leveled by retracting the ram 36 of hydraulic device 30 and the machine driven to the next bale for loading. The foregoing procedure is then repeated until the bed 38 is fully loaded with a series of bales aligned end-to-end, the leading bale in the series advancing progressively closer to the lift 120 each time an additional bale is added until, finally, the leading bale engages the cross member 146 of lift 120 and directly overlies the central panel 156. Thereupon, the operator may actuate the hydraulic device 140 to swing the lift 120 toward its raised position shown in phantom in FIG. 2 such that the leading bale is lifted off the bed 38 and progressively transferred laterally into the disintegrating rotors 108 and 110 of unit 68. The rotors 108 and 110 progressively disintegrate the bale and, if the machine is continuously advancing at this time, the disintegrated material simply drops through the discharge opening 104 into a windrow either along the ground or within a feed bunk alongside the advancing machine. The width of the stream issuing from discharge opening 104 may, of course, be varied by shifting the baffle 106 in a direction to enlarge or decrease the width of opening 104 as may be necessary or desirable.

As the leading bale is swung into the unit 68, the inclined panels 154 and 158 of the lift 120 cooperate with the central panel 156 thereof so as to effectively cradle the bale against escape. Since the bale is circular in transverse cross-section, it can have a tendency to roll about its longitudinal axis when engaged by the spinning rotors 108 and 110, but the containment provided by the cradle-like panels 154, 156 and 158 prevents the bale from rolling off lift 120. Note also that the upwardly arched lip 164 between panel 158 and the floor 100 of unit 68 serves as a sliding guide surface for the bale as it swings into the unit 68 and is disintegrated.

After the leading bale has been disintegrated, the lift 120 is lowered to its normal position across the bed 38, whereupon the series of bales supported by the bed 38 may be advanced forwardly by the conveying chains 46. When the next leading bale has arrived in a position overlying the lift 120, the chains 46 are deactivated, whereupon the lift 120 may again be raised to progressively feed the bale into the rotors 108 and 110 for disintegration and discharge to the ground or feed bunk. After thorough disintegration, the lift 120 is again lowered to its normal position and the foregoing cycle repeated until such time as all bales on the bed 38 have been disintegrated. Then, a new supply may be picked up using the loading technique illustrated in FIG. 7.

Normally, during loading, transport and disintegration of the bales, the machine will be positioned directly behind the towing vehicle for the sake of convenience, at which time the tongue 26 is articulated as illustrated in FIGS. 1 and 4. However, should it become necessary or desirable to dispose the machine to the left of the towing vehicle, viewed from the rear thereof, the ram 66 of hydraulic device 60 may be retracted such as to straighten the tongue 26 and thereby position the bed 38 to the left of the vehicle. It is to be understood, of course, that the principles of operation remain the same regardless of whether the bed 38 is directly behind the towing vehicle or off to one side thereof.

DESCRIPTION AND OPERATION OF FIGS. 8 AND 9

Figure 8:
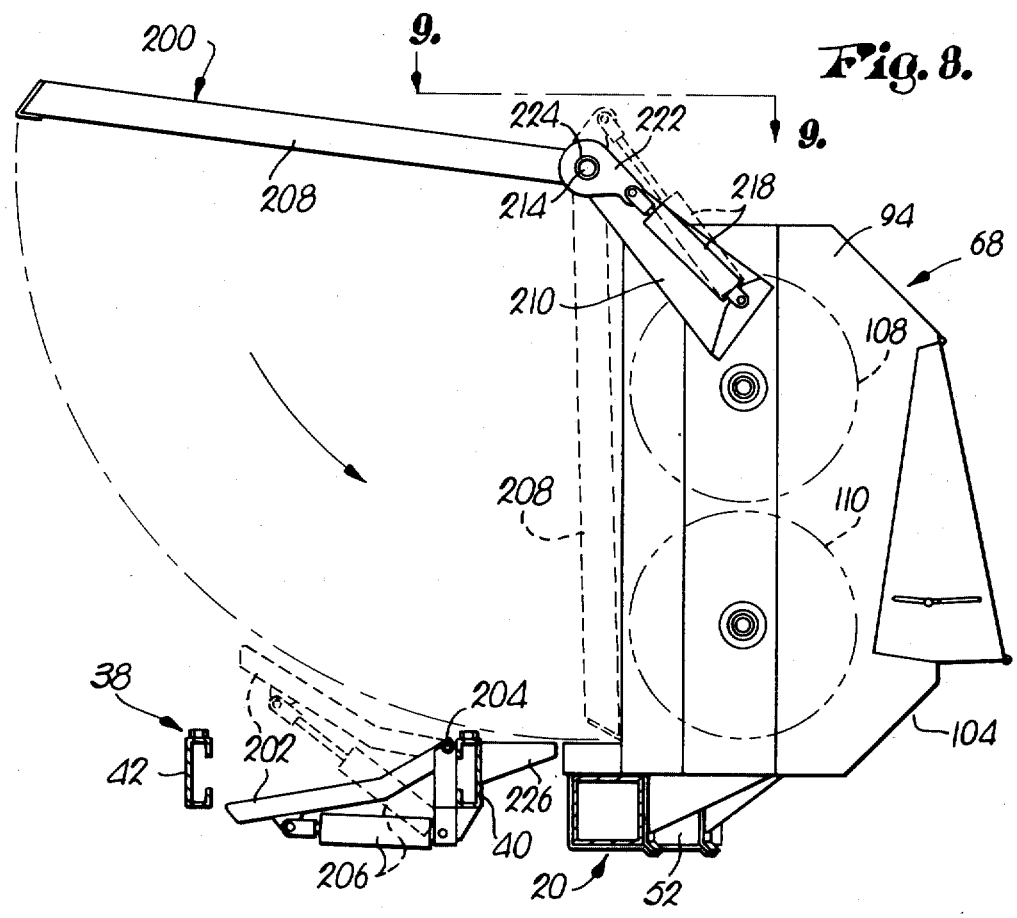
FIG. 8 is a view of the machine similar to FIG. 2 but illustrating a second form of lateral transfer apparatus.

The machine illustrated fragmentarily in FIG. 8 utilizes the same chassis 20 and bed 38 as the machine of FIGS. 1-7. It also uses the same disintegrating unit 68, with the exception only that the upper disintegrating rotor 108 is disposed directly above its lower counterpart 110 instead of being laterally offset therefrom. The difference lies in the lateral transfer apparatus 200 used to feed a bale from the bed 38 into the unit 68.

Apparatus 200 includes a slightly downward concave ramp 202 disposed between the beams 40 and 42 and swingably mounted on the beam 40 for movement about a fore-and-aft axis 204 between a lowered position illustrated in solid lines in FIG. 8 and a cocked position illustrated in phantom lines. A hydraulic piston and cylinder device 206 between beam 40 and ramp 202 supplies the force necessary to shift the latter to its cocked position, at which time ramp 202 generally faces the unit 68.

The apparatus 200 further includes an overhead feeding door 208 mounted by brackets 210 and 212 onto the opposite sidewalls 94 and 96 of the housing 88 for swinging movement about a fore-and-aft axis 214 between the raised position illustrated in solid lines in FIG. 8 and the lowered position illustrated in phantom lines. The location of axis 214 is such that when the ramp 202 is cocked upwardly, the door 208 sweeps across the top of ramp 202 in close proximity thereto, powered by a pair of hydraulic devices 216 and 218 coupled with cranks 220 and 222 respectively, that are attached to opposite ends of a torque shaft 224 of the door 208.

Accordingly, a bale overlying the ramp 202 is first cocked upwardly out of the space between the two beams 40 and 42, slightly toward the unit 68. Thereupon, the overhead door 208 is swung downwardly toward the rolls 108 and 110, sweeping the bale off ramp 202 and progressively into the unit 68 for disintegration. The material obtained from the bale may be directly dropped to the ground or into a feed bunk through the discharge opening 104 in a continuous windrow if the machine is advanced during such disintegration. Note that a ledge 226 between the beam 40 and the unit 68 substantially bridges those two structures so as to facilitate rolling the bale into the disintegrating rolls 108, 110. This procedure may be carried out several times over until all of the bales on the bed 38 have been disintegrated, the ramp 202 and the door 208 being returned to their normal lowered and raised positions respectively, following each disintegration cycle.

It is important to note that the lateral transfer apparatus 200 offers an advantage over apparatus 118 of the first embodiment in that with apparatus 200 the bed 38 may be self-loaded from either end. While the cross member 146 of apparatus 118 prevents loading bed 38 from the front thereof, there is no such member in apparatus 200 since the ramp 202 is safely tucked below the upper surface of beams 40, 42 and the door 208 is raised up and out of the way during the loading operation. Hence, with apparatus 200, the bed 38 may be tipped forwardly to the ground with the machine disposed to the left of the towing vehicle as viewed from the rear, and by driving the conveying chains 46 in reverse while forcing the beams 40 and 42 forwardly under a ground-supported bale, the latter may be drawn up onto the front of the bed 38 until a complete front loaded, end-to-end series of the bales is obtained. Such front loading capability may be highly desirable in certain circumstances.

DESCRIPTION AND OPERATION OF FIGS. 10 AND 11

Figure 11:
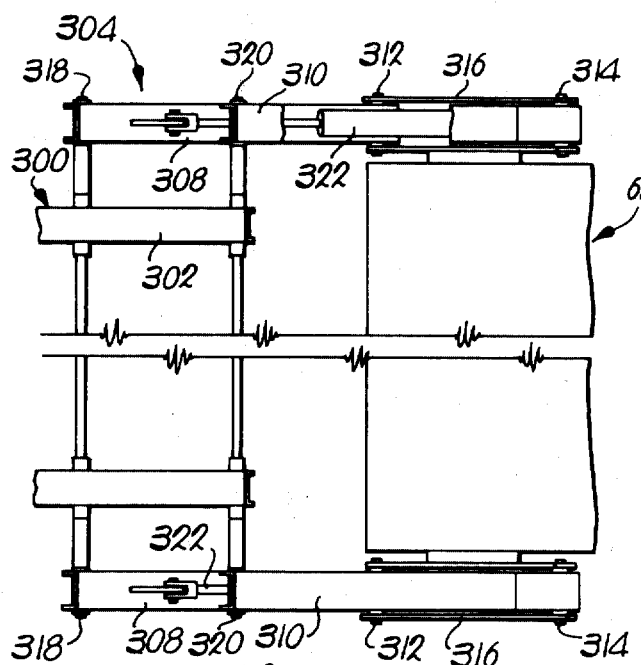
FIG. 11 is a fragmentary, cross-sectional view thereof taken along line 11—11 of FIG. 10.
Figure 9:
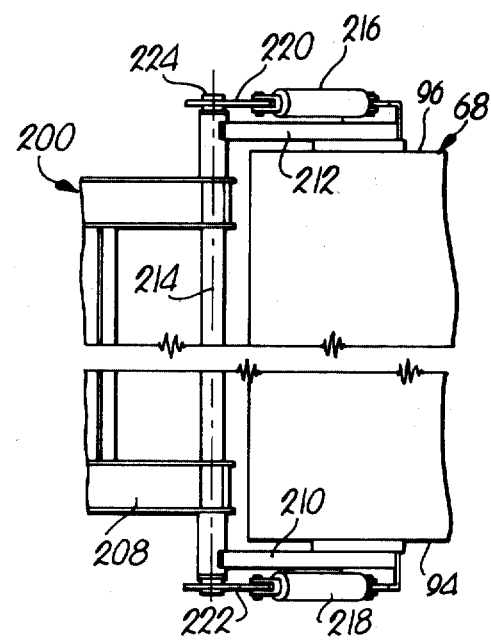
FIG. 9 is a fragmentary, cross-sectional view thereof taken along line 9—9 of FIG. 8.

As in the embodiment of FIGS. 8 and 9, the form of the invention illustrated in FIGS. 10 and 11 utilizes the same chassis 20, bed 38, and disintegrating unit 68, except for the fact that the upper disintegrating rotor 108 lies directly above the lower rotor 110. Again, the difference lies in the lateral transfer apparatus denoted by the numeral 300.

The apparatus 300 does not utilize any mechanism between the beams 40 and 42 to either completely or partially elevate the bale from the bed 38. Instead, only overhead structure is utilized, such being in the form of an upwardly arched feeder member 302 looped over the bed 38 and mechanism 304 on the unit 68 for drawing the member 302 across bed 38 toward unit 68. Alternate extreme positions of the feeder 302 and mechanism 304 are illustrated in FIG. 10.

Desirably, the mechanism 304 is operable to not only draw the feeder 302 across the bed 38, but also to do so in a slightly upwardly arched path of travel in order to effectively extract the bale from between the beams 40 and 42. To this end the mechanism 304 includes a skewed four-bar linkage 306 on each sidewall 94 and 96 of housing 88 respectively, each linkage 306 including a pair of crooked, laterally spaced links 308 and 310 pivoted at 312 and 314 respectively to an inclined, stationary mount 316 on the corresponding sidewalls 94 and 96. The links 308 and 310 have pivots 318 and 320 at their outermost ends to the feeder member 302, and a hydraulic piston and cylinder device 322 extends between links 308 and 310 out of parallelism with the mount 316.

Such oblique relationship between device 322 and mount 316, coupled with the fact that the distance between pivots 318 and 320 is less than that of pivots 312 and 314, causes the feeder member 302 to move in its upwardly arched path of travel as the links 308 and 310 are swung rearwardly upon contraction of the device 322. This action alleviates the need for lifting structure between the beams 40 and 42.

By progressively drawing the member 302 toward unit 68, a bale supported on the bed 38 beneath apparatus 300 may be progressively fed into the disintegrating rotors 108 and 110 for disintegration in the manner discussed above with regard to the first two embodiments. This particular embodiment shares the advantage with the second embodiment of either front or rear loading of the bed 38 inasmuch as no structure spans the bed 38 in the path of travel of bales being loaded onto the latter. This, then, can be a distinct advantage over apparatus 118 of FIGS. 1-7, although in some instances, the embodiment of FIGS. 1-7 may be much preferred.

It should now be apparent that regardless of which transfer apparatus 118, 200 or 300 is selected for use, the operator is assured of unobstructed vision to the rear of the machine such as permit safe, sure loading and disintegration. Moreover, in each instance the disintegrated material may be dropped directly from unit 68 into a windrow on the ground or in a feed bunk to facilitate feeding while on the move.

Having thus described the invention, what is claimed as new and desired to be secured by Letters Patent is:

1. In a machine for transporting and disintegrating a body of crop material while on the move:
   a mobile bed for carrying the body off the ground during transport;
   crop disintegrating structure for said body; and apparatus for transferring the body laterally from a wholly intact position on the bed to a wholly disintegrated position outboard of the normal path of travel of the bed,
   all of said structure being disposed outboard of said path of travel of the bed and in disposition to receive the body from said transfer apparatus,
   said structure having an outlet for discharging the disintegrated crop material in a stream laterally outboard of the bed.

2. In a machine as claimed in claim 1, wherein said bed is sufficiently long to simultaneously support a plurality of individual crop bodies arranged along the length of the bed; and a conveyor on the bed movable in a direction for successively presenting the bodies to said apparatus.

3. In a machine as claimed in claim 1, wherein said bed is tiltable to the ground independently of said unit and about a transverse axis to facilitate loading.

4. In a machine as claimed in claim 3, wherein said bed is provided with a chassis that supports the bed for said tilting movement thereof, said unit being fixedly mounted on the chassis against movement with the bed.

5. In a machine as claimed in claim 4, wherein said chassis includes a towing tongue alongside the bed, said structure being mounted on said tongue.

6. In a machine as claimed in claim 5, wherein said tongue includes a laterally swingable section for varying the draft angle of the tongue.

7. In a machine as claimed in claim 6, wherein said tongue further includes a laterally stationary section, said structure being mounted on said stationary section.

8. In a machine as claimed in claim 1, wherein said bed is tiltable to the ground about a transverse axis and is provided with a loading conveyor movable in a direction for drawing a body onto the tilted bed.

9. In a machine as claimed in claim 8, wherein said bed includes a pair of laterally spaced, fore-and-aft extending beams, said conveyor including an endless flexible element looped longitudinally around each of said beams respectively and movable along the length thereof.

10. In a machine as claimed in claim 1, wherein said structure includes at least one disintegrating rotor rotatable about an axis extending parallel to said path of travel of the bed.

11. In a machine as claimed in claim 10, wherein said structure further includes a housing having a floor beneath said rotor and a rear wall outboard of the rotor, said rear wall and said floor having a gap therebetween presenting said discharge outlet of the unit.

12. In a machine for transporting and disintegrating a body of crop material while on the move:
   a mobile bed for carrying the body off the ground during transport;
   a disintegrating unit disposed laterally outboard of the bed with respect to the normal path of travel of the bed; and apparatus for transferring the body from the bed and into said unit for disintegration by the latter, said unit having an outlet for discharging the disintegrated crop material in a stream laterally outboard of the bed, said apparatus including a lift swingable about a fore-and-aft extending axis between a lowered position for receiving the body to be disintegrated and a raised position for transferring the body into said unit.

13. In a machine as claimed in claim 12, wherein said lift is mounted on the bed.

14. In a machine as claimed in claim 13, wherein said axis of swinging movement of the lift is disposed laterally outboard of the bed in the direction of said unit.

15. In a machine as claimed in claim 13, wherein said bed includes a pair of laterally spaced, fore-and-aft extending beams disposed for supporting a body when the latter is carried by the bed, said lift including structure between said beams in position to underlie a body supported by the beams when the lift is in its lowered position.

16. In a machine as claimed in claim 12, wherein said apparatus further includes a fluid-pressure piston and cylinder device coupled with the lift for swinging the latter between its raised and lowered positions.

17. In a machine for transporting and disintegrating a body of crop material while on the move:

a mobile bed for carrying the body off the ground during transport;

a disintegrating unit disposed laterally outboard of the bed with respect to the normal path of travel of the bed; and apparatus for transferring the body from the bed and into said unit for disintegration by the latter, said unit having an outlet for discharging the disintegrated crop material in a stream laterally outboard of the bed, said apparatus including a ramp swingable between a lowered position for receiving the body on the bed and a cocked position for urging the body toward the unit, said apparatus further including an overhead, swingable feeder for sweeping the body off the cocked ramp and into the unit.

18. In a machine as claimed in claim 17, wherein said apparatus further includes fluid pressure, piston and cylinder devices coupled with said ramp and said feeder for effecting said swinging thereof.

19. In a machine as claimed in claim 17, wherein said ramp is mounted on the bed.

20. In a machine as claimed in claim 19, wherein said feeder is mounted on the unit.

21. In a machine as claimed in claim 20, wherein said bed includes a pair of laterally spaced, fore-and-aft extending supporting beams for the body, said ramp being disposed between said beams.

22. In a machine for transporting and disintegrating a body of crop material while on the move:

a mobile bed for carrying the body off the ground during transport;

a disintegrating unit disposed laterally outboard of the bed with respect to the normal path of travel of the bed; and apparatus for transferring the body from the bed and into said unit for disintegration by the latter, said unit having an outlet for discharging the disintegrated crop material in a stream laterally outboard of the bed, said apparatus including a feeder above the bed and shiftable across the latter toward and away from the unit.

23. In a machine as claimed in claim 22, wherein said feeder is movable along an upwardly arched path of travel during said shifting.

24. In a machine as claimed in claim 22, wherein said feeder is mounted to draw the body toward the unit during said shifting.

25. In a machine as claimed in claim 22, wherein said feeder includes an overhead, upwardly arched member and mechanism on said unit for drawing the member across the bed and toward the unit in close proximity to the bed.

26. In a machine as claimed in claim 25, wherein said mechanism includes means for moving the member along an upwardly arched path of travel during said drawing thereof.

27. In a machine as claimed in claim 26, wherein said means includes a skewed four-bar linkage coupled with said member and power means for actuating said linkage.

28. In a machine as claimed in claim 26, wherein said bed includes a pair of laterally spaced, fore-and-aft extending beams for supporting a body spanning the beams.

29. In a machine as claimed in claim 1; and means for loading a body onto said bed.

30. In a method of handling a body of crop material, the steps of:

loading a body onto a mobile bed;

transporting the body on said bed as the latter advances along a path of travel;

transferring the body laterally as advancement of the bed continues;

maintaining the body wholly intact prior to said lateral transfer;

progressively disintegrating the body at a position laterally outboard of the bed as said transfer is effected; and dropping the disintegrated material from said outboard position in a continuous stream as the bed continues to advance along said path of travel.

31. In a method as claimed in claim 30, wherein said loading step includes moving the body onto the bed in a fore-and-aft direction with respect to said path of travel.

32. In a method as claimed in claim 30, wherein said loading step includes tilting said bed to the ground about a transverse axis and drawing the body onto the tilted bed in a fore-and-aft direction with respect to said path of travel.

33. In a method as claimed in claim 30; loading a plurality of bodies onto the bed until a series thereof is presented which extends in a fore-and-aft direction with respect to said path of travel; transporting the series on the bed; and carrying out said transferring, disintegrating and dropping steps on each body successively in the series.

34. In a method as claimed in claim 33, wherein transfer, disintegration, and dropping are always carried out on an end body in the series; and following each transfer, disintegration, and dropping of an end body, advancing the remaining bodies in the series toward the vacated location of the previous end body until a new end body is presented at said location.

35. In a method of handling a body of crop material, the steps of:

loading a body onto a mobile bed;

transporting the body on said bed as the latter advances along a path of travel;

transferring the body laterally as advancement of the bed continues;

progressively disintegrating the body at a position laterally outboard of the bed as said transfer is effected; and dropping the disintegrated material from said outboard position in a continuous stream as the bed continues to advance along said path of travel, said transferring step including lifting the body off the bed and swinging the same toward said outboard position.

36. In a method of handling a body of crop material, the steps of:

loading a body onto a mobile bed;

transporting the body on said bed as the latter advances along a path of travel;

transferring the body laterally as advancement of the bed continues;

progressively disintegrating the body at a position laterally outboard of the bed as said transfer is effected; and dropping the disintegrated material from said outboard position in a continuous stream as the bed continues to advance along said path of travel, said transferring step including cocking the body toward said outboard position from beneath the body and then sweeping the cocked body toward said position from above the body.

37. In a method of handling a body of crop material, the steps of:

loading a body onto a mobile bed;

transporting the body on said bed as the latter advances along a path of travel;

transferring the body laterally as advancement of the bed continues;

progressively disintegrating the body at a position laterally outboard of the bed as said transfer is effected; and dropping the disintegrated material from said outboard position in a continuous stream as the bed continues to advance along said path of travel, said transferring step including drawing the body toward said outboard position in a stroke that crosses the bed in an upwardly arched path of travel.

* * * * *